(12) United States Patent
Quentin et al.

(10) Patent No.: US 10,650,381 B2
(45) Date of Patent: May 12, 2020

(54) METHOD FOR DETECTING A RISK OF SUBSTITUTION OF A TERMINAL, CORRESPONDING DEVICE, PROGRAM AND RECORDING MEDIUM

(71) Applicant: INGENICO GROUP, Paris (FR)

(72) Inventors: Pierre Quentin, Enghien-les-Bains (FR); David Naccache, Paris (FR)

(73) Assignee: INGENICO GROUP, Paris (FR)

(*) Notice: Subject to any disclaimer, the term of this patent is extended or adjusted under 35 U.S.C. 154(b) by 216 days.

(21) Appl. No.: 15/511,141

(22) PCT Filed: Sep. 15, 2015

(86) PCT No.: PCT/EP2015/071129
§ 371 (c)(1),
(2) Date: Mar. 14, 2017

(87) PCT Pub. No.: WO2016/041985
PCT Pub. Date: Mar. 24, 2016

(65) Prior Publication Data
US 2017/0255939 A1    Sep. 7, 2017

(30) Foreign Application Priority Data

Sep. 16, 2014 (FR) ..................... 14 58749

(51) Int. Cl.
*G06Q 20/40* (2012.01)
*G06Q 20/32* (2012.01)
*G06Q 20/20* (2012.01)

(52) U.S. Cl.
CPC ......... *G06Q 20/4016* (2013.01); *G06Q 20/20* (2013.01); *G06Q 20/202* (2013.01); *G06Q 20/3224* (2013.01)

(58) Field of Classification Search
CPC .. G06Q 20/4016; G06Q 20/20; G06Q 20/202; G06Q 20/3224
See application file for complete search history.

(56) References Cited

U.S. PATENT DOCUMENTS

| | | | | | |
|---|---|---|---|---|---|
| 5,719,918 | A | * | 2/1998 | Serbetciouglu | ........ G06Q 20/04 379/93.12 |
| 7,464,862 | B2 | * | 12/2008 | Bacastow | ............. G06Q 20/20 235/380 |
| 7,543,739 | B2 | * | 6/2009 | Brown | ............ G06K 19/06187 235/375 |

(Continued)

OTHER PUBLICATIONS

International Preliminary Report on Patentability dated Sep. 28, 2015 for corresponding International Application No. PCT/EP2015/071129, filed Sep. 15, 2015.

(Continued)

*Primary Examiner* — Fahd A Obeid
*Assistant Examiner* — Michael Jared Walker
(74) *Attorney, Agent, or Firm* — David D. Brush; Westman, Champlin & Koehler, P.A.

(57) ABSTRACT

A method is provided for detecting a risk of replacement, at a sales point, of an authentic electronic payment terminal by a fraudulent electronic payment terminal. Wherein the method includes generating an alert when a number of transactions geographically associated with the sales point is above a pre-determined threshold.

7 Claims, 2 Drawing Sheets

(56) References Cited

U.S. PATENT DOCUMENTS

| | | | | |
|---|---|---|---|---|
| 7,584,153 B2* | 9/2009 | Brown | G07F 7/1083 | 235/380 |
| 7,630,924 B1* | 12/2009 | Collins | G06Q 50/22 | 235/380 |
| 7,740,168 B2* | 6/2010 | Hammad | G06Q 20/04 | 235/379 |
| 8,355,982 B2* | 1/2013 | Hazel | G06Q 20/04 | 705/35 |
| 8,554,631 B1* | 10/2013 | Barton | G06Q 20/20 | 705/16 |
| 8,600,817 B2* | 12/2013 | Whitsitt | G06Q 10/06 | 705/16 |
| 8,602,293 B2* | 12/2013 | Hammad | G06Q 20/12 | 235/375 |
| 8,668,568 B2* | 3/2014 | Denker | G01S 5/0036 | 463/17 |
| 8,706,621 B2* | 4/2014 | Carlson | G06Q 20/02 | 705/39 |
| 8,768,838 B1* | 7/2014 | Hoffman | G06Q 40/00 | 705/44 |
| 8,793,188 B2* | 7/2014 | Larkin | G06Q 20/20 | 705/44 |
| 9,033,225 B2* | 5/2015 | Hefetz | G06Q 20/32 | 235/382 |
| 10,204,333 B2* | 2/2019 | Fourez | G06Q 20/32 | |
| 2003/0061163 A1* | 3/2003 | Durfield | G06Q 20/04 | 705/44 |
| 2006/0255125 A1* | 11/2006 | Jennings, Jr. | G06Q 20/20 | 235/380 |
| 2008/0162346 A1* | 7/2008 | Aaron | G06Q 20/24 | 705/44 |
| 2009/0018940 A1* | 1/2009 | Wang | G06Q 40/00 | 705/35 |
| 2009/0125429 A1* | 5/2009 | Takayama | G06Q 20/04 | 705/35 |
| 2010/0114617 A1* | 5/2010 | Bobbitt | G06Q 20/202 | 705/75 |
| 2011/0014939 A1* | 1/2011 | Ravishankar | H04W 48/04 | 455/515 |
| 2011/0078034 A1* | 3/2011 | Hayhow | G06Q 20/20 | 705/21 |
| 2011/0087535 A1* | 4/2011 | Yoshizawa | G06Q 20/20 | 705/14.26 |
| 2011/0131104 A1* | 6/2011 | Rose | G06Q 20/20 | 705/17 |
| 2011/0238564 A1* | 9/2011 | Lim | G06Q 20/3223 | 705/38 |
| 2012/0105460 A1* | 5/2012 | Kim | G09B 5/062 | 345/501 |
| 2012/0109762 A1* | 5/2012 | Getchius | G06Q 20/20 | 705/17 |
| 2012/0232981 A1* | 9/2012 | Torossian | G06Q 30/06 | 705/14.27 |
| 2012/0244885 A1* | 9/2012 | Hefetz | G06Q 20/32 | 455/456.2 |
| 2013/0018789 A1* | 1/2013 | Kaufmann | G06Q 20/4016 | 705/44 |
| 2013/0041822 A1* | 2/2013 | Wagner | G06O 20/32 | 705/44 |
| 2013/0046635 A1* | 2/2013 | Grigg | G06Q 30/0238 | 705/14.58 |
| 2014/0108251 A1* | 4/2014 | Anderson | G06Q 20/4016 | 705/44 |

OTHER PUBLICATIONS

International Search Report dated Sep. 28, 2015 for corresponding International Application No. PCT/EP2015/071129, filed Sep. 15, 2015.

Written Opinion of the International Searching Authority dated Sep. 28, 2015 for corresponding International Application No. PCT/EP2015/071129, filed Sep. 15, 2015.

* cited by examiner

METHOD FOR DETECTING A RISK OF SUBSTITUTION OF A TERMINAL, CORRESPONDING DEVICE, PROGRAM AND RECORDING MEDIUM

CROSS-REFERENCE TO RELATED APPLICATIONS

This Application is a Section 371 National Stage Application of International Application No. PCT/EP2015/071129, filed Sep. 15, 2015, which is incorporated by reference in its entirety and published as WO 2016/041985 A1 on Mar. 24, 2016, not in English.

1. FIELD OF THE INVENTION

The invention relates to the field of payment terminals. The technique relates more particularly to the securing of payment terminals.

2. PRIOR ART

Payment terminals are subjected to numerous hacking attempts. Indeed, because of the nature of the information that they contain and the sensitivity of the data that they process, payment terminals are of great value to malicious persons.

A certain type of fraud is becoming widespread: this is a type of fraud where an authentic/valid payment terminal is replaced by a fraudulent/counterfeit payment terminal. A substitution is carried out on the authentic payment terminal in a business establishment and this authentic terminal is immediately replaced by a payment terminal that has an appearance of validity but has actually been modified, for example in order to read and copy data from customers' bank cards, so as to enable the performance of fraudulent transactions with preliminarily read client data. The merchant who is unaware can easily be duped and it will be several days before he realizes that the substitution has been made.

One way to resolve this problem of replacement is to apply a tag or marking to the terminal. Such a tag enables the merchant to realize that his terminal has been replaced. This technique is efficient when the fraudulent person is not himself in a position to reproduce this tag. This technique is therefore limited by the capacity of the fraudulent individual to reproduce the tag. Now, for a tag to be efficient, it must be visible. If this tag is visible, then it is also visible to the fraudulent individual who can therefore easily reproduce it. Thus, this simple solution for applying a tag is actually not really efficient.

Another way to resolve this problem is to have only wired payment terminals, i.e. payment terminals that are physically connected to a cash register for example. This solution is no doubt efficient but is in fact ill-suited to the current practice of offering greater mobility to merchants and customers. Nevertheless, this technique is used for example in large stores and in certain types of shops.

The existing techniques are however limited when fraud has to be prevented in smaller-scale shops. There is therefore a need to provide the technique that enables the merchant to detect fraud by substitution of terminals and that makes it possible for him to prevent the negative effects of such fraud.

3. SUMMARY OF THE INVENTION

The invention relates to a method for detecting a risk of replacement of an authentic electronic payment terminal by a fraudulent electronic payment terminal at a sales point.

According to various embodiments of the invention, the method comprises a step for generating an alert when a number of transactions geographically associated with the sales point is above a pre-determined threshold (Si).

Thus, the invention proposes a novel and inventive solution for combating the substitution of payment terminals enabling the rapid detection if, at a sales point, a given authentic electronic payment terminal has been replaced by a fraudulent electronic payment terminal, by detecting a number of suspicious transactions that are suspect because their number is greater than an "expected" number of transactions for a given sales point.

To this end, the invention in its different embodiments is based on the fact that most sales points enjoy functions that make it possible, for each transaction made, to know and communicate information on the location of the transaction. It is therefore possible to list all the transactions made in the same place.

Now, when a fraudulent electronic payment terminal has been replaced by an authentic electronic payment terminal at a sales point, the number of transactions performed by this fraudulent electronic payment terminal is generally far greater than the number of transactions "classically" performed by an authentic electronic payment terminal. Indeed, the goal sought by this type of fraud is to implement a large number of transactions by using a same piece of data read from a card involved in a "true" transaction several times.

Thus, for example, for a transaction corresponding to a real purchase of an item or a service at a sales point through a client's bank card, a fraudulent terminal successively carries out the plurality of transactions using data of this bank card of the customer even if the card is no longer present in the electronic payment terminal.

The invention, in its different embodiments, therefore enables the detection of a suspicious number of transactions for a given sales point and the generation of an alert accordingly.

For example, the alert indicates that, for a given period (a morning or the two hours preceding the alert), the number of transactions has exceeded a pre-determined threshold and that this can be an indication of an attempted fraud against the electronic payment terminal.

According to one particular aspect of the invention, the method comprises the following steps for at least one transaction made:

- a step for receiving at least one piece of information on location of the transaction;
- a step for geographically associating the transaction with the sales point when the received information on location is substantially identical to that of the sales point, delivering a number of transactions geographically associated with the sales point.

Thus, according to this embodiment of the invention, a transaction is associated with a sales point according to the information on location associated with the place at which a transaction is made, received by the device implementing the invention.

It is thus possible to count up the number of transactions located in proximity to a given sale point.

In particular, the step for receiving a piece of information on location comprises a sub-step for authenticating the received piece of information on location.

Thus, according to this embodiment of the invention, the information on location is authenticated before a transaction is geographically associated with a sales point in such a way as to respond to a securing requirement. Indeed, according to the principle of the invention and its different embodiments, the location of a transaction plays a role in determining an attempt at fraud and it should therefore not be open to question.

For example, this authentication of location can be based on the use of an identifier or a password or else on a challenge/response type of exchange between the device providing the information on location and the server receiving it, or any other technique that can be used to ensure that the information on location is authentic and truly corresponds to the place of the transaction.

According to one particular characteristic, the sales point is associated with at least one merchant and the method furthermore comprises a step for sending out the generated alert towards at least one entity pre-associated with the merchant.

Thus, according to this embodiment of the invention, one sales point is associated with one merchant, which is mostly the case (except in a multiple-merchant sales point), and the alert generated following the detection of a suspicious number of transactions associated with this sales point is transmitted for example to a mobile terminal of the merchant or to his cash-desk computer.

Thus, in a first stage, the merchant can ask questions about the number of transactions truly made during the period in question and can validate or not validate the possibility that a unusually great number of transactions has actually been made (for example, the number of transactions can indeed be greater than normal during periods of sales or periods of special and one-time promotional or sales actions).

Then, if the number of transactions made does not seem to him to have been greater than a pre-determined average, the merchant can ascertain that the electronic payment terminal that he is using for transactions with his clients is authentic or that it has effectively been replaced by a fraudulent electronic payment terminal.

For example, the merchant can verify the serial number or other distinctive signs enabling him to recognize the authentic electronic payment terminal or he can decide to no longer use the electronic payment terminal if he has a doubt on its authenticity without being able to verify it by himself.

For example, the information on location corresponds to the GPS coordinates of the place at which the transaction is made.

According to one particular aspect of the invention, the method comprises a step for determining a piece of information on location of the sales point and the step of association implements a comparison between the information on location of the transaction and the sales point.

For example, the method is implemented by a remote server corresponding to a server of at least one banking institution of the merchant.

Thus, according to this embodiment of the invention, the pieces of information on location corresponding to the place of each transaction made are transmitted through a device of the sales point to the bank server of at least one bank account of the merchant, pre-identified and capable of implementing the invention.

This remote server can therefore implement the invention for a plurality of sales points or merchants. In this case, it receives information on location corresponding potentially to a plurality of pre-identified sales points and, for a given transaction, compares the received information on location with the locations of these different sales points so as to associate the transaction with the corresponding sales point.

The invention also relates to a device for detecting a risk of replacement, in a sales point, of an authentic electronic payment terminal by a fraudulent electronic payment terminal comprising means for generating an alert when a number of transactions geographically associated with the sales point is greater than a pre-determined threshold (SI). Such a device is especially suited to implementing the method described previously. Such a device could of course comprise the different characteristics pertaining to the method according to the invention which can be combined or taken in isolation. Thus, the characteristics and advantages of this device are the same as those of the method of optimization and shall not be described in more ample detail.

The invention also relates to one or more computer programs comprising instructions to implement a method for detecting a risk of substitution or replacement as described here above when this program or these programs are executed by a processor.

The method for detecting a risk of substitution according to the invention can therefore be implemented in various ways, especially in wired form or in software form. This program or these programs can use any programming language whatsoever and can be in the form of source code, object code or a code that is intermediate between source code and object code, such as in a partially compiled form or in any other desirable form whatsoever.

The invention finally relates to a computer-readable recording medium comprising instructions to execute the steps of the method for detecting a risk of substitution as described here above.

4. FIGURES

Other features and advantages of the proposed technique shall appear more clearly from the following description of a preferred embodiment, given by way of a simple illustratory and non-exhaustive example and from the appended drawings, of which FIG. 1 is a block diagram of the proposed technique according to one particular embodiment;

5. DESCRIPTION

5.1. General Principle

Figure 1:
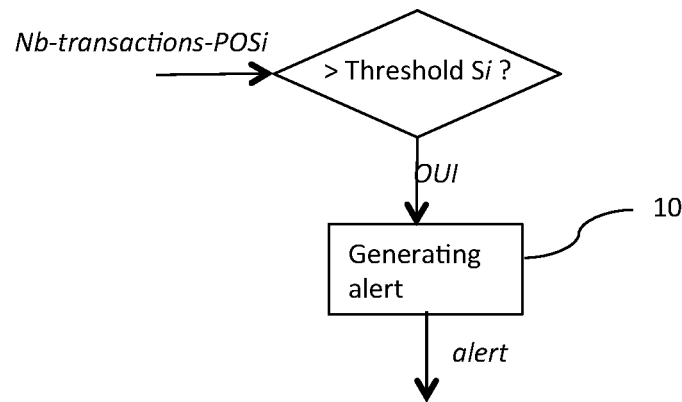

The general principle of the proposed technique described with reference to FIGS. 1 and 2 consists of the detection, for a given sales point, of a number of suspicious transactions to generate an alert of a risk of replacement of an authentic electronic payment terminal by a fraudulent electronic payment terminal.

Indeed, in the case of a replacement, in a given sales point, of the authentic electronic payment terminal by a fraudulent electronic payment terminal, a large number of fraudulent transactions are performed in a short time, using card data read for example during the first "real" transaction made when a customer purchases an item or a service.

Thus, the detection of a number Nb-transactions-POSi of transactions that are suspicious because this number is greater than a pre-determined number represented by a threshold denoted as Si, in proximity to a sales point, enables the generation of an alert, at a step 10, about a risk of replacement of the authentic electronic payment terminal by a fraudulent electronic payment terminal at this sales point.

To this end, it is necessary initially to detect the number of transactions made at the sales point, i.e. to geographically associate a transaction with a given sales point.

Numerous sales points possess this function making it possible not only to know (and communicate) their geolocation but also to communicate a piece of information on location associated with each transaction performed at a sales point.

For example, at a given sales point, the merchant's cash desk can communicate the geolocation of the sales point (the position of the cash-desk computer or another place at the sales point) and know the geolocation of the electronic payment terminal or terminals used at this sales point.

In another example, the electronic payment terminal itself that benefits from this function enabling it to know its own location within the sales point and communicate it either to another entity of the sales point (the cash-desk computer or a merchant's terminal) or to a remote server.

Thus, in a large store, it is possible for example to know the location of a particular point such as the reception or the central cash desk but also the position of each of the electronic payment terminals associated with the different cash desks.

For example, the location of a place corresponds to the GPS coordinates of this place. The location of a place can also be obtained by using an IP address (of an electronic payment terminal, a computer etc.), a Universally Unique Identifier (UUID) of & "beacon" type sensor, the mobile network coordinates, the caller number in the case of a landline telephone etc.

In addition, it is also possible progressively, or even comprehensively at the end of a given period, to list all the transactions made by an electronic payment terminal. This information representing each transaction made can for example be centralized for a sales point at a particular entity such as the central cash desk of a large store or a cash-desk computer in the case of a small merchant.

It is therefore possible, for any transaction made at a sales point, to obtain a piece of information representing the location associated with each transaction.

Using this information on location associated with this transaction and knowing the geolocation of a given sales point, it is possible to geographically associate a transaction with a given sales point.

To meet security needs and prevent false alerts, the invention according to one embodiment provides for authenticating the information on location received before geographically associating a transaction with a given sales point.

For example, this authentication can be based on an identifier or password transmitted with the information on location by the entity providing this information on location. The authentication can also be based on a challenge/response type of exchange between the device sending out the information on location and the device receiving it. The information on location can also be transmitted by a sensor generating a piece of encrypted information or a sensor situated in an encrypting enclosure thus enabling authentication of the transmitted information on location. The information on location can also be entered manually and associated with a physical link between the electronic payment terminal implementing the transaction and the given sales point.

Any other method/technique used to authenticate the information on location, when generated or when it is being transmitted, can also be implemented in order to secure the geographical association of a transaction with a given sales point.

The invention in its different embodiments then makes it possible, for a given period, or in real time, to count the number of transactions geographically associated with a given sales point and compare this number with a pre-determined threshold associated with this given sales point in order to generate or not generate an alert depending on this comparison.

According to a first alternative embodiment, the number of transactions geographically associated with this given sales point is incremented in real time, at each new transaction made, and this number is compared at each increment with the pre-determined threshold associated with the given sales point. Thus, an alert can be generated as soon as the number of transactions geographically associated with the give sales point exceeds a pre-determined threshold.

According to a second alternative embodiment, the number of transactions geographically associated with a given sales point is incremented in real time, at each new transaction made, but this number is compared with the pre-determined threshold associated with the given sales point only periodically, for example every two hours or again at the end of the morning or at the end of the day. Thus, an alert can be generated periodically.

Whatever the variant, the alert generated is then transmitted preferably to the merchant so that he can verify whether the substitution of terminals has actually happened and act accordingly.

For example, the alert is transmitted to the merchant via a message on a pre-identified communications terminal such as the sales point landline or the merchant's mobile phone or again his computer. In this way, the merchant can then verify whether the electronic payment terminal used has been replaced by a fraudulent electronic payment terminal and, if this is so, stop using it. The merchant can also ignore the alert in cases of exceptional use of the electronic payment terminal, for example if in fact an exceptionally large number of clients has made purchases over the given period.

In the case of a large department store implementing a plurality of electronic payment terminals (also called a fleet of terminals), the alert can be transmitted to a person pre-identified as being in charge of security of the fleet of electronic payment terminals who will then make the checks needed to confirm or deny that there has been a replacement of the electronic payment terminal or terminals by one or more fraudulent electronic payment terminals.

According to one particular embodiment of the invention, in such a situation of a fleet of electronic payment terminals, if the location associated with each transaction made in the large store is sufficiently precise (for example when it is associated with the cash desk with which each electronic payment terminal is connected), then the electronic payment terminal that could have been replaced by a fraudulent electronic payment terminal can also be identified precisely, without any need to check all the electronic payment terminals of the fleet.

In all the situations, the invention in its different particular embodiments can be implemented by an entity situated at the given sales point or by a remote entity called a remote server for example.

Thus, if we again consider the example of a large store having a fleet of electronic payment terminals, the invention can be implemented in a central entity for the management of payment terminals within the large store itself. For example, this central entity is connected to a local-area network to which all the cash desks are also connected. Through the local-area network, these cash desks send the central entity a precise piece of information on location associated with each transaction made by a cash desk. In this way, the central entity can geographically associate each transaction with the large store (the given sales point) using this information on location and on the geolocation of the large store. It is then also the central entity that generates the alert when the number of transactions geographically associated with the sales point exceeds a pre-determined threshold.

Figure 2:
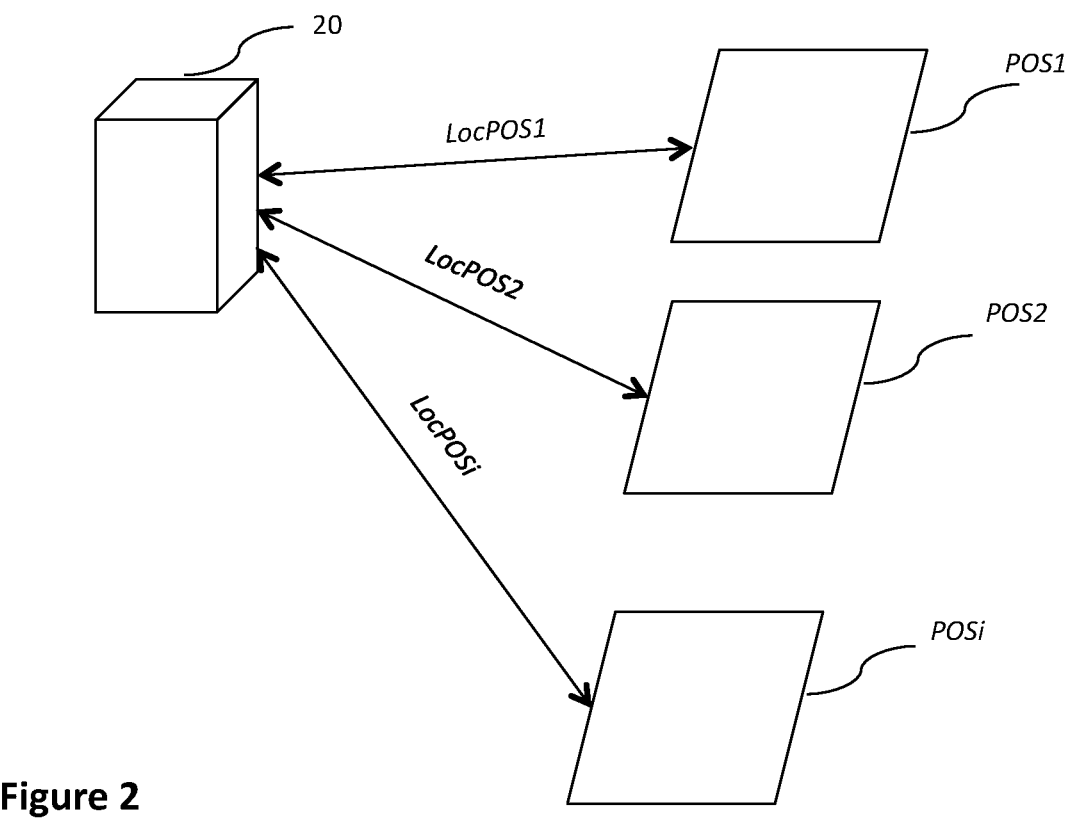
FIG. 2 is a system in which the proposed technique can be implemented according to one particular embodiment.

According to one alternative embodiment illustrated in FIG. 2, an entity 20 remote from any sales point implements the invention in its different embodiments.

For example, this remote entity corresponds to a remote server of a banking institution and more particularly to a banking institution managing one or more bank accounts for one or more sales points POS1, POS2, . . . POSi.

Thus, each of the merchants of the sales points POS1, POS2, . . . POSi is deemed to have subscribed to a service for managing the security of the electronic payment terminals through his banking institution, the service being especially implemented by the remote server 20.

According to this embodiment of the invention, for each transaction made at a given sales point, a piece of information on location LocPOSi is transmitted to this remote serve 20. This server carries out several steps internally enabling it if necessary to generate an alert to be sent to one or more sales points.

Thus, initially, the remote server geographically associates each transaction with the corresponding sales points, on the basis of information on location LocPOSi received and of information on location of the different sales points, received preliminarily through each of the sales points. For example, this information on location associated with the given sales point is transmitted to the remote server 20 at the time when the merchant of the given sales point subscribes to the above-mentioned service for managing the security of the electronic payment terminals. The remote server 20 then memorizes each of the locations of the sales points concerned so as to then be able to establish the geographical associations of these transactions.

In a second stage, the remote server 20 compares the number of geographical transactions associated with the sales point with a pre-determined threshold for this sales point. This pre-determined threshold can be given to the remote server at the same time as the information on location of the sales point, for example when the merchant of the given sales point subscribes to the above-mentioned service for managing the security of the electronic payment terminals.

As already described here above, the number of transactions geographically associated with a sales point can be compared with a threshold pre-determined for this sales point as and when the transactions are made or periodically.

In addition, the pre-determined threshold associated with a given sales point can be static or variable, for example depending on time.

Thus, depending on the activity of a sales point, several thresholds can be defined as a function of particular time periods. Thus, one threshold can be defined for weekdays and a different threshold can be determined for Saturdays (days with potentially greater activity), or else different thresholds can be defined according to the time of day with a specific threshold for the midday time slot. Particular periods of sales or periods of specific promotional operations can also be taken into account to define a specific threshold. Such a variable threshold makes it possible indeed to remove or at least to limit the generation of "false" alerts.

Finally, when the remote server 20 has detected the fact that a number of transactions geographically associated with a sales point is greater than the threshold associated with this sales point, the server 20 generates an alert and transmits it, according to the different embodiments already described here above, to a pre-defined entity (the portable terminal of the merchant or of a person in charge of security of a fleet of terminals).

Thus, the proposed solution, in the different particular embodiments described here above which can be combined with each other, makes it possible to detect a risk of replacement of an authentic electronic payment terminal by a fraudulent electronic payment terminal and, in the event of detection of such a risk, to alert the person pre-identified as being capable of validating or not validating the fact that this replacement has taken place and of implementing the associated actions if necessary.

5.2. Other Characteristics and Advantages

Figure 3:
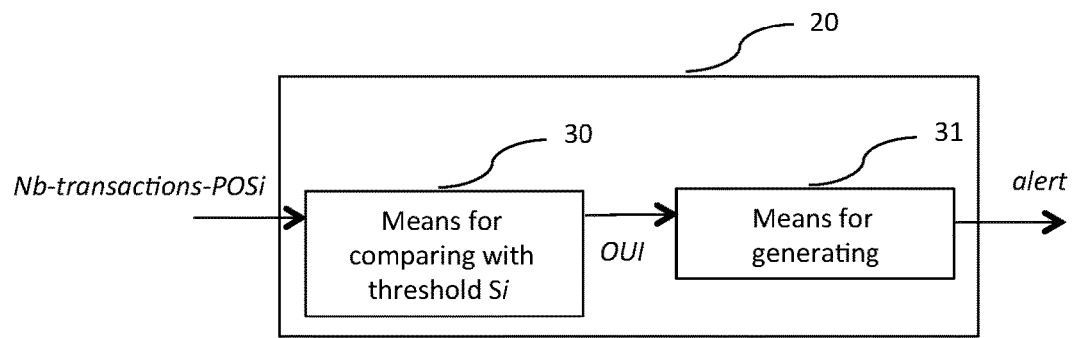
FIGS. 3 and 4 show two examples of a detection device according to the proposed technique according to one particular embodiment.
Figure 4:
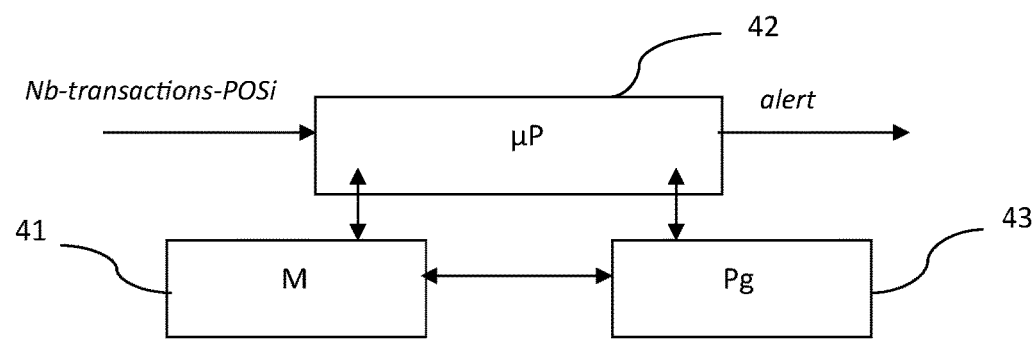

Referring to FIGS. 3 and 4, we describe an example of a device for detecting a risk of replacement, in a sales point, of an authentic electronic payment terminal by a fraudulent electronic payment terminal comprising means for executing the method described here above.

As illustrated in FIG. 3, such a device 20, for example a remote server as described here above with reference to FIG. 2 or again an entity of a sales point, comprises means 30 (for example in the form of one or more modules) for comparing a number Nb-transactions-POSi of transactions, geographically associated with a given sales point, with a pre-determined threshold Si for this sales point. The device 20 also comprises means (for example in the form of one or more modules) for generating an alert 31 when the means of comparison have delivered a positive result.

This device 20 is now described with reference to FIG. 4.

For example, the device comprises a memory 41 constituted by a buffer memory, a processing unit 42 equipped for example with the microprocessor and driven by the computer program 43 implementing a method for verifying authenticity.

At initialization, the code instructions of the computer program 43 are for example loaded into a memory and then executed by the processor of the processing unit 42. The processing unit 42 inputs for example a number Nb-transactions-POSi of transactions geographically associated with a given sales point. The microprocessor of the processing unit 42 implements the steps of the method for detecting a risk of replacement, in a sales point, of an authentic electronic payment terminal by a fraudulent electronic payment terminal, according to the instructions of the computer program 43 to generate an alert.

To this end, the device comprises, an addition to the buffer memory 41, means 30 for comparing a number Nb-transactions-POSi of transactions, geographically associated with the given sales point, with a pre-determined threshold Si for this sales point and means (for example in the form of one or more modules) for generating an alert 31, when the means of comparison have delivered a positive result.

The invention claimed is:

1. A method for detecting replacement, at a sales point, of an authentic electronic payment terminal by a fraudulent electronic payment terminal, wherein the method comprises the following acts performed by a device comprising a non-transitory computer-readable medium comprising program code instructions stored thereon and a processor configured by the program code instructions to perform the acts:
receiving, from an entity distinct from said device, at least one piece of information on a location of a transaction made by said authentic electronic payment terminal or said fraudulent electronic payment terminal, wherein the processor is configured to be able to receive the at least one piece of information on the location of a transaction made by said authentic electronic payment terminal and said fraudulent electronic payment terminal, said act of receiving a piece of information on the location comprising:
a sub-act of authenticating said received piece of information on the location to ensure that the information on location is authentic, said sub-act of authenticating being based on an identifier or a password transmitted by said entity or based on a challenge/response type of exchange between said entity and said device, said act of receiving delivering an authenticated information on location;
geographically associating said transaction with said sales point when said authenticated information on location is identical to that of said sales point, delivering a number of transactions geographically associated with said sales point; and
generating an alert, that the authentic electronic payment terminal may have been replaced by the fraudulent electronic payment terminal, when the number of transactions geographically associated with said sales point is above a pre-determined threshold and transmitting the alert over a network to a pre-defined entity on the network.

2. The method for detecting according to claim 1, wherein said sales point is associated with at least one merchant and the method furthermore comprises sending out said generated alert towards at least one entity pre-associated with said merchant.

3. The method for detecting according to claim 1, wherein said at least one piece of information on the location corresponds to the GPS coordinates of a place at which the transaction is made.

4. The method for detecting according to claim 1, wherein the method comprises an act of determining a piece of information on location of said sales point, and said act of association implements a comparison between said information on location of said transaction and the sales point.

5. The method for detecting according to claim 2, wherein the method is implemented by a remote server corresponding to a server of at least one banking institution of said merchant.

6. A device for detecting replacement, in a sales point, of an authentic electronic payment by a fraudulent electronic payment terminal, wherein the device comprises:
a non-transitory computer-readable medium comprising program code instructions stored thereon;
a processor configured to be able to receive at least one piece of information on a location of a transaction made by said authentic electronic payment terminal and said fraudulent electronic payment terminal, wherein the processor is configured by the program code instructions to perform acts comprising:
receiving, from an entity distinct from said device, the at least one piece of information on the location of the transaction made by said authentic electronic payment terminal or said fraudulent electronic payment terminal, said act of receiving a piece of information on the location comprising:
a sub-act of authenticating said received piece of information on the location to ensure that the information on the location is authentic, said sub-act of authenticating being based on an identifier or a password transmitted by said entity or based on a challenge/response type of exchange between said entity and said device, said act of receiving delivering an authenticated information on location;
geographically associating said transaction with said sales point when said authenticated information on location is identical to that of said sales point, delivering a number of transactions geographically associated with said sales point; and
generating an alert, that the authentic electronic payment terminal may have been replaced by the fraudulent electronic payment terminal, when the number of transactions geographically associated with said sales point is greater than a pre-determined threshold and transmitting the alert over a network to a pre-defined entity on the network.

7. A non-transitory computer-readable medium comprising instructions stored thereon for performing a method of detecting replacement, in a sales point, of an authentic electronic payment by a fraudulent electronic payment terminal, when the instructions are executed by a processor, wherein the instructions configure the processor to perform acts comprising:
receiving at least one piece of information on a location of a transaction made by said authentic electronic payment terminal or said fraudulent electronic payment terminal, wherein the processor is configured to be able to receive the at least one piece of information on the location of a transaction made by said authentic electronic payment terminal and said fraudulent electronic payment terminal, said act of receiving a piece of information on the location comprising:
a sub-act of authenticating said received piece of information on the location to ensure that the information on location is authentic, said sub-act of authenticating being based on a challenge/response type of exchange between said entity and said device, said act of receiving delivering an authenticated information on location;
geographically associating said transaction with said sales point when said authenticated information on location is identical to that of said sales point, delivering a number of transactions geographically associated with said sales point; and
generating an alert, that the authentic electronic payment terminal may have been replaced by the fraudulent electronic payment terminal, when the number of transactions geographically associated with said sales point is greater than a pre-determined threshold and transmitting the alert over a network to a pre-defined entity on the network.

* * * * *